(12) United States Patent
Nagasawa

(10) Patent No.: US 8,475,223 B2
(45) Date of Patent: Jul. 2, 2013

(54) METHOD OF MANUFACTURING DISPLAY DEVICE AND DISPLAY DEVICE

(75) Inventor: Koichi Nagasawa, Aichi (JP)

(73) Assignee: Japan Display West Inc., Aichi (JP)

( * ) Notice: Subject to any disclaimer, the term of this patent is extended or adjusted under 35 U.S.C. 154(b) by 0 days.

(21) Appl. No.: 13/086,861

(22) Filed: Apr. 14, 2011

(65) Prior Publication Data

US 2011/0281491 A1    Nov. 17, 2011

(30) Foreign Application Priority Data

May 17, 2010  (JP) .................................. 2010-112997

(51) Int. Cl.
*H01J 9/00* (2006.01)
(52) U.S. Cl.
USPC ........................................................ 445/24
(58) Field of Classification Search
USPC ........................................................ 445/24
See application file for complete search history.

(56) References Cited

U.S. PATENT DOCUMENTS

| 2008/0032433 A1* | 2/2008 | Kang | 438/30 |
| 2008/0299690 A1* | 12/2008 | Hirota | 438/30 |

FOREIGN PATENT DOCUMENTS

| JP | 05-307181 | 11/1993 |
| JP | 07-120767 | 12/1995 |
| JP | 10-62789 | 6/1998 |

* cited by examiner

*Primary Examiner* — Anh Mai
*Assistant Examiner* — Michael Santonocito
(74) *Attorney, Agent, or Firm* — Dentons US LLP

(57) ABSTRACT

A method of manufacturing a display device includes the steps of: forming a positive type photoresist above a surface of a first transparent substrate having a transistor formed on the surface thereof so as to cover the transistor; radiating a light from a back surface side of the first transparent substrate to the first transparent substrate having the positive type photoresist formed thereabove, for exposing the positive type photoresist; developing the positive type photoresist thus exposed to selectively leave the positive type photoresist located above the transistor, for forming a spacer; and laminating a second transparent substrate above the surface of the first transparent substrate through the spacer.

8 Claims, 7 Drawing Sheets

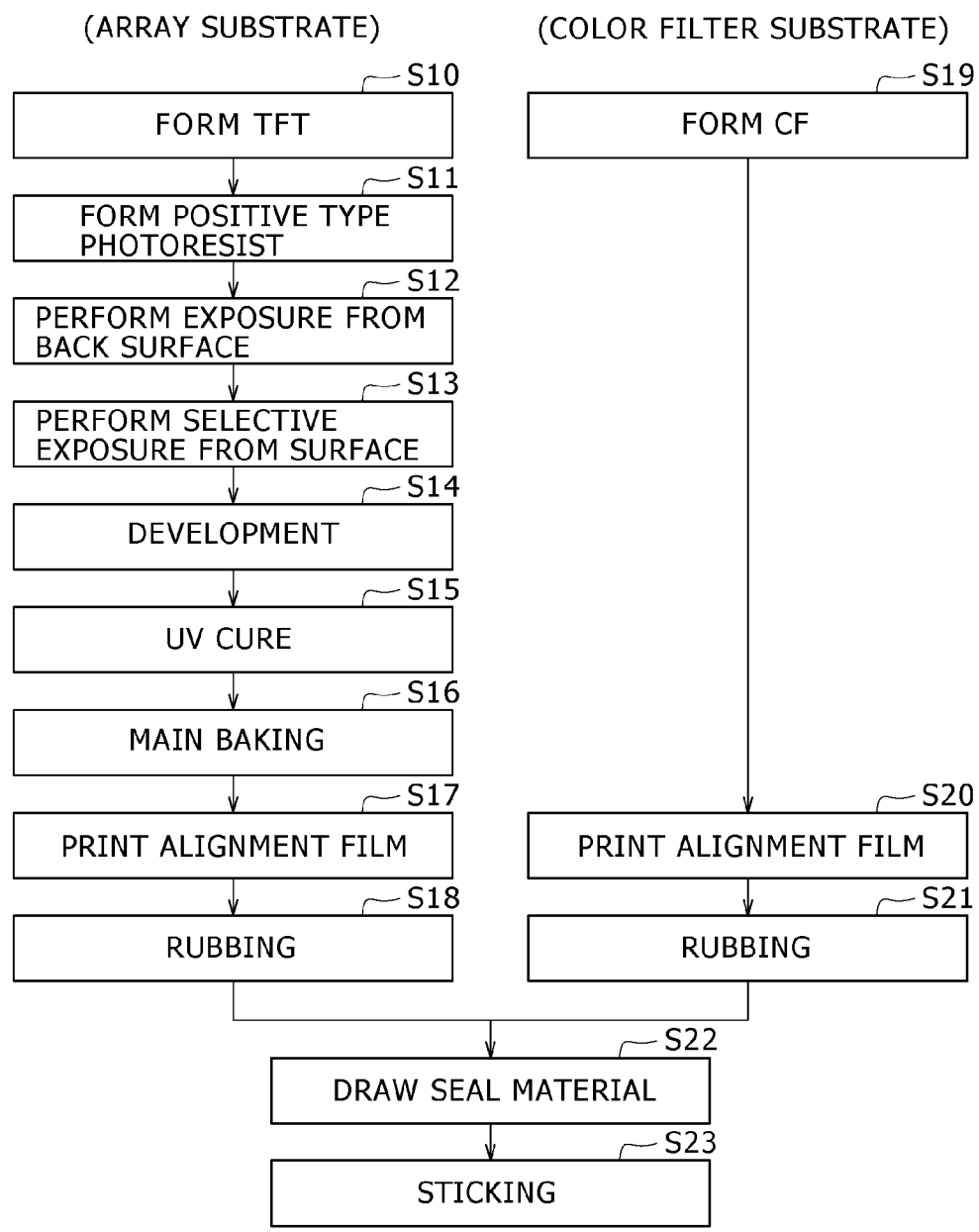

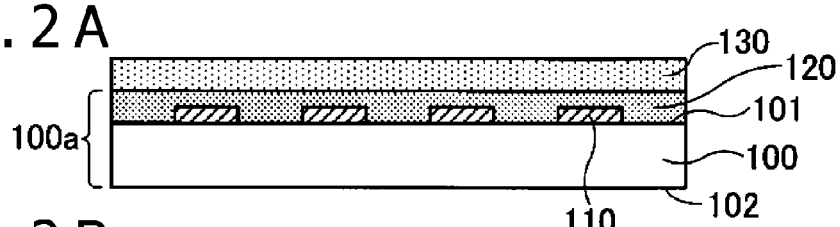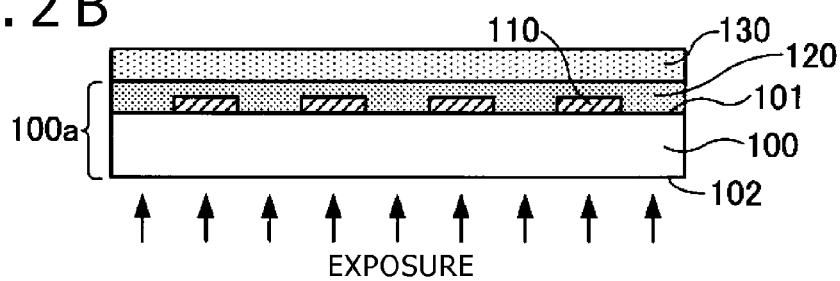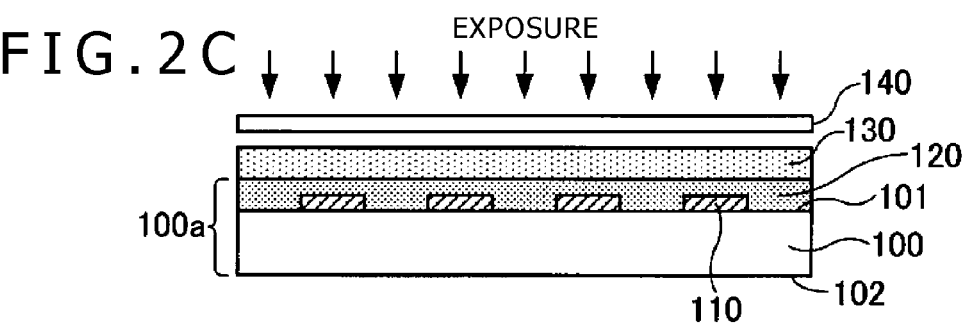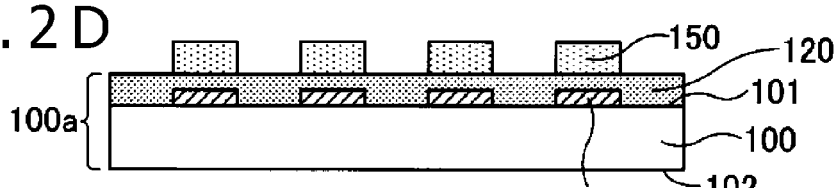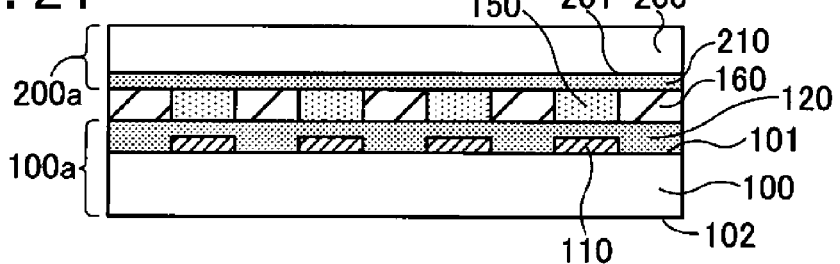

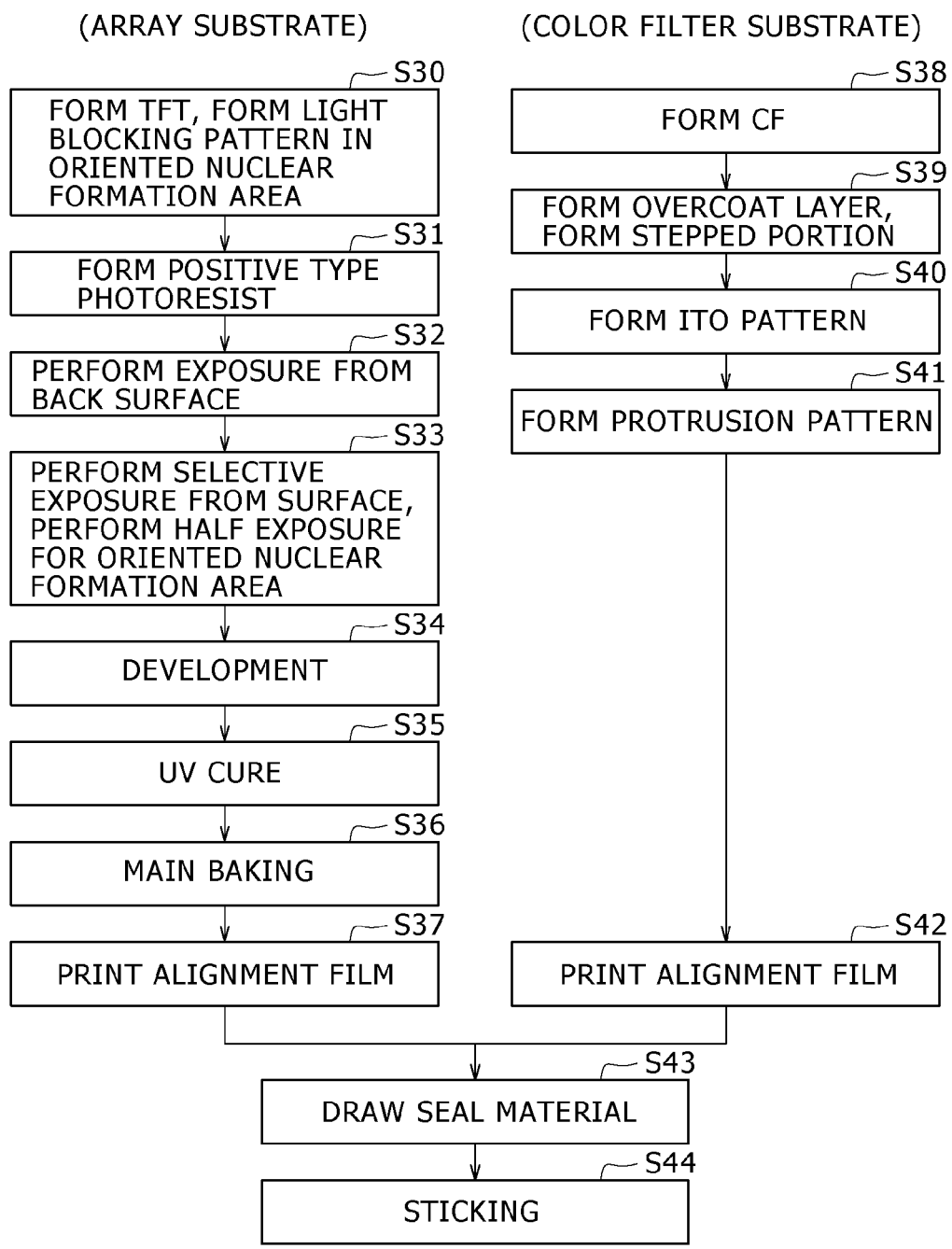

METHOD OF MANUFACTURING DISPLAY DEVICE AND DISPLAY DEVICE

BACKGROUND OF THE INVENTION

1. Field of the Invention

The present invention relates to a method of manufacturing a display device, and the display device.

2. Description of the Related Art

A display device having an array substrate and a color filter substrate exists. In this case, in the array substrate, plural transistors such as Thin Film Transistors (TFTs) are formed in an array on a transparent substrate. Also, the color filter substrate is laminated above the array substrate through a liquid crystal layer and color filters thereof are formed on the transparent substrate.

In the display device, plural spacers are disposed between the array substrate and the color filter substrate for the purpose of ensuring a spacer for formation of the liquid crystal layer. Since no liquid crystal layer is formed in an area in which the plural spacers exist, there is the possibility that a light transmitted through the spacers to be usually leaked to reduce a contrast.

For this reason, in the array substrate, a light blocking pattern for blocking the light is formed in an area corresponding to the area in which the spacer is disposed. However, in this structure, an area for formation of the light blocking pattern needs to be newly provided in the array substrate. Therefore, a light transmission area in a pixel, that is, an opening area is reduced. In a word, an aperture ratio of the pixel is reduced.

On the other hand, there is known a technique for disposing the spacer above an area of the array substrate in which the TFT is formed. Since the TFT has a metallic pattern for blocking the light, the TFT functions as a light blocking area. For this reason, the spacer is disposed above the area in which the TFT is formed, whereby the spacer can be diverted to a light blocking pattern for the measures taken to cope with the light leakage due to the spacers. With this technique, since the area for formation of the light blocking pattern needs not to be newly provided in the array substrate, it is possible to increase the aperture ratio of the pixel.

For example, there is known a technique with which a gap control layer for controlling a gap defined between an active element side substrate and a facing side substrate is formed above an active element formed on the active element side substrate. This technique, for example, is described in Japanese Patent Laid-open No. Hei 10-62789 (hereinafter referred to as Patent Document 1).

In addition, a technique with which after a photosensitive resin is formed on a substrate having a light blocking layer formed thereon and exposure is carried out for the photosensitive resin from a back surface side with the light blocking layer as a mask, a development and baking treatment is carried out, thereby selectively forming a spacer on the light blocking layer is known as one of methods of manufacturing spacers. This technique, for example, is described Japanese Patent Laid-open No. Hei 5-307181. In addition, there is known a technique with which back surface exposure patterning is carried out with a black matrix pattern on a substrate as a mask by using a linear beam, thereby forming a protrusion body between parallel substrates. This technique, for example, is described Japanese Patent Laid-open No. Hei 7-120767.

SUMMARY OF THE INVENTION

However, with the technique described Patent Document 1, after the gap control layer becoming the spacer is formed on the facing side substrate, the active element side substrate and the facing side substrate are superposed on each other. Therefore, there is the possibility that the gap control layer is shifted from the area in which the active element is formed due to an error of a superposition precision to run over to the light transmission area, and a light is leaked from the gap control layer thus run over.

The present invention has been made in order to solve the problems described above, and it is therefore desire to provide a method of manufacturing a display device in which an aperture ratio is increased while light leakage due to a spacer is suppressed, and the display device.

In order to attain the desire described above, according to an embodiment of the present invention, there is provided a method of manufacturing a display device including the steps of: forming a positive type photoresist above a surface of a first transparent substrate having a transistor formed on the surface thereof so as to cover the transistor; radiating a light from a back surface side of the first transparent substrate to the first transparent substrate having the positive type photoresist formed thereabove, for exposing the positive type photoresist; developing the positive type photoresist thus exposed to selectively leave the positive type photoresist located above the transistor, for forming a spacer; and laminating a second transparent substrate above the surface of the first transparent substrate through the spacer.

According to another embodiment of the present invention, there is provided a display device including: a first transparent substrate having a surface on which a transistor is formed; a spacer formed above the surface of the first transparent substrate, located above a drain electrode composing the transistor, and made of a positive type photoresist as a material; a liquid crystal layer formed above the surface of the first transparent substrate so as to surround the spacer; and a second transparent substrate laminated above the surface of the first transparent substrate through the spacer and the liquid crystal layer.

As set forth hereinabove, according to the method of manufacturing a display device, and the display device of the present invention, the aperture ratio can be enhanced while the light leakage due to the spacer is suppressed.

BRIEF DESCRIPTION OF THE DRAWINGS

FIG. 1 is a flow chart showing a method of manufacturing a display device according to a first embodiment of the present invention;

FIGS. 2A to 2F are cross sectional views showing manufacturing processes in the method of manufacturing a display device according to the first embodiment of the present invention, respectively;

FIG. 6 is a flow chart showing a method of manufacturing a display device according to a second embodiment of the present invention.

DETAILED DESCRIPTION OF THE PREFERRED EMBODIMENTS

Figure 3:
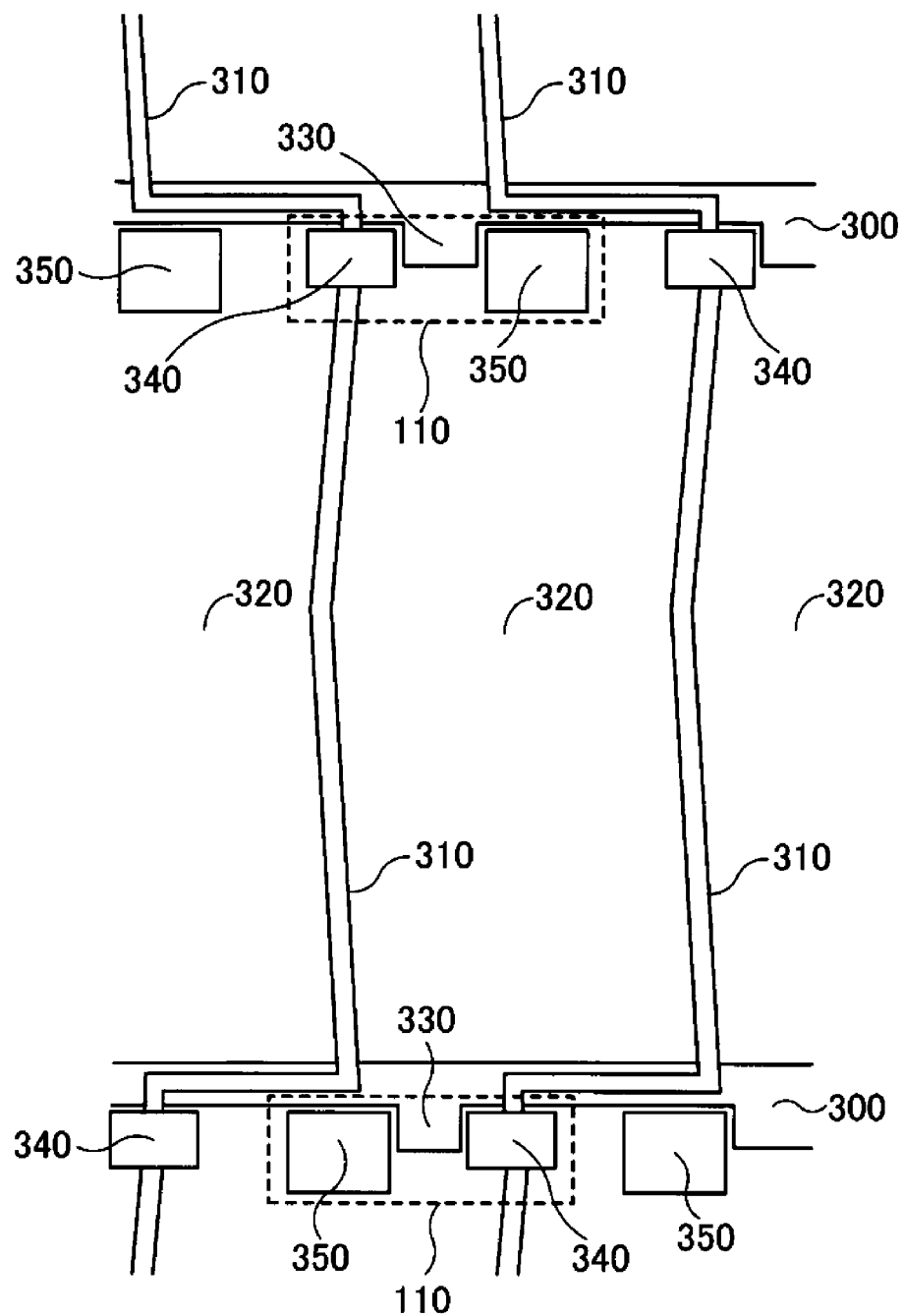
FIG. 3 is a top plan view showing an example of a layout of a metallic pattern of an array substrate in the first embodiment of the present invention.

The preferred embodiments of the present invention will be described in detail hereinafter with reference to the accompanying drawings.

First Embodiment

FIG. 1 is a flow chart showing a method of manufacturing a display device according to a first embodiment of the present invention. Also, FIGS. 2A to 2F are cross sectional views showing manufacturing processes in the method of manufacturing a display device according to the first embodiment of the present invention, respectively. Hereinafter, the method of manufacturing a display device according to the first embodiment of the present invention will be described in accordance with the flow chart of FIG. 1 with reference to the process chart of FIGS. 2A to 2F.

Firstly, a method of manufacturing an array substrate side will be described.

[Step S10] As shown in FIG. 2A, a transistor 110 is formed on a surface 101 of a transparent substrate 100. A glass substrate, for example, is used as the transparent substrate 100. A Thin Film Transistor (TFT), for example, is used as the transistor 110. A large number of pixel areas are provided in an array in the transparent substrate 100, and the transistor 110 is formed every pixel area. The transistor 110 functions as a switching element for controlling supply of an electric power to a transparent electrode (not shown) which is provided every pixel area.

In addition, the transistor 110 has a gate electrode, a source electrode, and a drain electrode which are composed of a metallic pattern which blocks a light. The transistor 110 functions as a light blocking pattern for blocking a light based on such a metallic pattern.

It is noted that a planarizing film 120 is formed on the surface 101 of the transparent substrate 100 so as to cover the transistor 110. Either an inorganic film which functions as a passivation use application, or an organic film which functions as a planarizing use application is used as the planarizing film 120. In addition, both the inorganic film and the organic film may also be laminated to be used as the planarizing film 120. A pixel electrode and the like complying with liquid crystal modes for controlling an alignment of a liquid crystal are formed on the planarizing film 120. Here, a substrate member in which the transistor 110, the planarizing film 120, and the pixel electrode structure complying with the liquid crystal modes are formed on the surface 101 of the transparent substrate 100 is taken to be an array substrate 100a.

[Step S11] Next, a positive type photoresist 130 is formed on the array substrate 100a. The positive type photoresist 130, for example, contains therein as a photosensitive agent a naphthoquinone diazide sulfonic acid ester compound. In addition, a copolymer containing therein either acrylic acid ester or methacrylic acid ester, for example, is used as a resin in the positive type photoresist 130. The positive type photoresist 130, for example, is formed by applying the liquid positive type photoresist 130 onto the array substrate 100a by utilizing a spin coating method.

[Step S12] Next, as shown in FIG. 2B, a light is radiated from a back surface 102 side of the transparent substrate 100 to the array substrate 100a having the positive type photoresist 130 formed thereon, thereby exposing the positive type photoresist 130. A light in which wavelengths of i to g rays are used as the dominant wavelengths, for example, is radiated under such a condition that an exposure amount becomes 400 mJ/cm$^2$, thereby carrying out the exposure.

In this exposure process, of the positive type photoresist 130, an area except for an area located on the transistor 110 is exposed. Of the positive type photoresist 130, the area located on the transistor 110 is not exposed because the exposure light is blocked for that area by the transistor 110. That is to say, the positive type photoresist 130 is selectively exposed in a self-align manner with the transistor 110 as a mask.

[Step S13] Next, as shown in FIG. 2C, a light is radiated from the surface 101 side of the transparent substrate 100 to the array substrate 100a having the positive type photoresist 130 formed thereon through a mask 140, thereby selectively exposing the positive type photoresist 130. The light in which wavelengths of the i to g rays are used as the dominant wavelengths, for example, is radiated under such a condition that the exposure amount becomes 200 mJ/cm$^2$, thereby carrying out the exposure. The exposure is carried out by using an exposure patterning apparatus, such as a stepper, which is capable of carrying out alignment.

In this exposure process, of the positive type photoresist 130, an area which is not yet exposed in the phase of the exposure in Step S12 described above due to presence of the metallic pattern other than the transistor 110, and an area, such as an area located on a pad area, in which the positive type photoresist 130 is desired not to be finally left are selectively exposed. It is noted that the process in Step S13 can also be replaced in order with the process in Step S12 described above.

[Step S14] Next, as shown in FIG. 2D, the positive type photoresist 130 thus exposed is developed. In this development process, the portions of the positive type photoresist 130 which are exposed by the exposure process in Step S12, and the exposure process in Step S13, respectively, are removed away, and the portion of the positive type photoresist 130 located on the transistor 110 is selectively left to become a spacer 150.

[Step S15] Next, Ultraviolet (UV) cure is carried out for the spacer 15. As a result, it becomes possible to suppress a deformation of the spacer 150 by thermal reflow in a post exposure bake process. It is noted that when the spacer 150 is made of a material having a sufficiently high glass-transition point, the UV cure may not be carried out.

[Step S16] Next, the post exposure bake is carried out for the spacer 150, thereby subjecting the spacer 150 to the main baking.

[Step S17] Next, an alignment film (not shown) is formed on the array substrate 100a by utilizing a printing method.

[Step S18] Next, rubbing is carried out for the alignment film formed on the array substrate 100a as may be necessary.

Next, a method of manufacturing a color filter substrate side will be described.

[Step S19] Firstly, as shown in FIG. 2E, a color filter (CF) 210 is formed on a surface 201 of a transparent substrate 200. A glass substrate, a polycarbonate substrate or the like, for example, is used as the transparent substrate 200. The color filter 210 is composed of a resin film containing therein either dyes or pigments having the three primary colors; Red (R), Green (G) and Blue (B). Here, a substrate member in which the color filter 210 is formed on the surface 201 of the transparent substrate 200 is taken to be a color filter substrate 200a.

[Step S20] Next, an alignment film (not shown) is formed on the color filter substrate 200a by utilizing the printing method.

[Step S21] Next, the rubbing is carried out for the alignment film formed on the color filter substrate 200a as may be necessary.

Next, a process for laminating the array substrate 100a and the color filter substrate 200a on each other will be described.

[Step S22] Firstly, a seal material (not shown) is supplied to any one of the array substrate 100a or the color filter substrate 200a. The seal material is drawn along an external periphery of either the array substrate 100a or the color filter substrate 200a.

[Step S23] Next, as shown in FIG. 2F, the color filter substrate 200a is laminated on the array substrate 100a through a spacer 150. Here, the color filter substrate 200a is laminated on the array substrate 100a through the spacer 150 in such a way that the surface 101 of the transparent substrate 100, and the surface 201 of the transparent substrate 200 face each other. That is to say, the array substrate 100a and the color filter substrate 200a are stuck to each other by the seal material.

As a result, a predetermined space is held between the array substrate 100a and the color filter substrate 200a by the spacer 150. It is noted that in the first embodiment, the spacer 150 is formed by patterning the positive type photoresist 130 formed on the array substrate 100a. For this reason, for example, the uniformity in height among the spacers 150 can be enhanced as compared with the case where the spacers 150 individually formed are used. In addition, since the positive type photoresist is used as the spacer material, even if the color filter substrate 200a side has a complicated stepped structure, the heights of the spacers 150 can be flexibly uniformized by the selective half exposure from the surface. As a result, it is possible to uniformize a gap defined between the array substrate 100a and the color filter substrate 200a.

A liquid crystal 160 is formed between the array substrate 100a and the color filter substrate 200a so as to surround the spacer 150. Before the array substrate 100a and the color filter substrate 200a are laminated on each other, the liquid crystal material is supplied to any one of the array substrate 100a or the color filter substrate 200a, thereby forming the liquid crystal layer 160. Or, after the array substrate 100a and the color filter substrate 200a are laminated on each other, the liquid crystal material is supplied to a space defined between the array substrate 100a and the color filter substrate 200a, thereby forming the liquid crystal layer 160.

The display device is manufactured in the processes described above. It is noted that in the display device, a light for display, that is, a backlight is radiated from the back surface 102 side of the transparent substrate 100.

Next, a description will be given with respect to a layout of a metallic pattern including the transistor 110 formed in the array substrate 100a.

FIG. 3 is a top plan view showing an example of the layout of the metallic pattern in the array substrate in the first embodiment of the present invention.

Plural gate lines 300 and plural signal lines 310 are formed above the surface 101 of the transparent substrate 100. The gate lines 300 and the plural signal lines 310 extend so as to intersect with each other. Each of the gate lines 300, for example, is made of molybdenum (Mo), and each of the signal lines 310, for example, is made of aluminum (Al). Plural pixel area 320 surrounded by the gate lines 300 and the signal lines 310 are provided in an array on the surface 101 of the transparent substrate 100.

A gate electrode 330 formed so as to branch from the gate line 300, a source electrode 340 electrically connected to the signal line 310, and a drain electrode 350 are disposed in the pixel area 320. Each of the source electrode 340 and the drain electrode 350, for example, is formed from a lamination film made of titanium (Ti) and aluminum (Al). The transistor 110 is composed of the gate electrode 330, the source electrode 340, and the drain electrode 350. It is noted that the drain electrode 350 is electrically connected to a transparent electrode (not shown) formed above the pixel area 320.

Since the metallic pattern blocks a light, an area in which the metallic pattern is disposed becomes a light blocking area.

Figure 4:
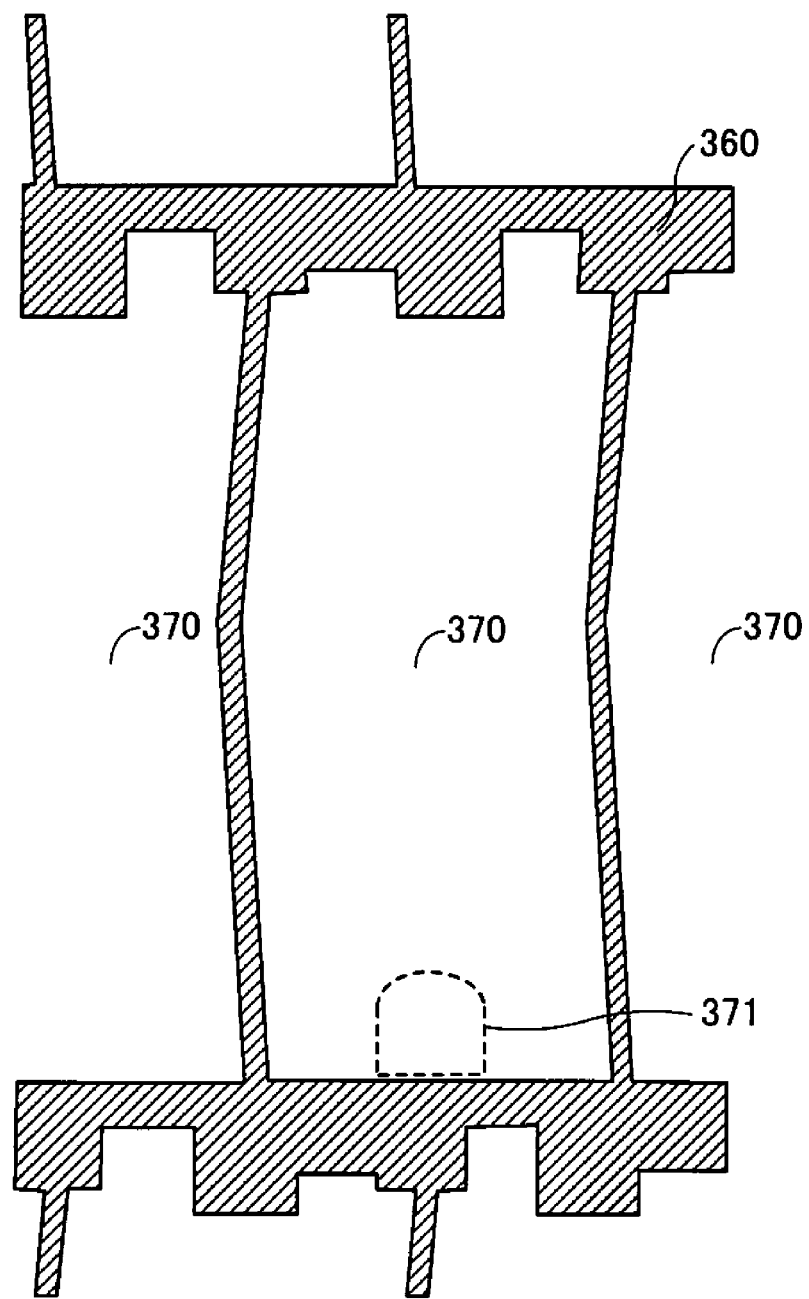
FIG. 4 is a top plan view showing an example of a layout of a light blocking area of the array substrate in the first embodiment of the present invention.

FIG. 4 is a top plan view showing an example of a layout of the light blocking area in the array substrate in the first embodiment.

As shown in FIG. 4, of the array substrate 100a, an area in which the gate line 300, the signal line 300, the gate electrode 310, the source electrode 340, and the drain electrode 350 are disposed becomes entirely the light blocking area 360. Also, an area other than the light blocking area 360 becomes a light transmission area which transmits a light, that is, an opening area 370. Here, a ratio of the opening area 370 in the pixel area 320 is referred to as an aperture ratio.

In the back surface exposure process in Step S12 described above, an area of the positive type photoresist 130 located above the light blocking area 360 is not exposed, but an area of the positive type photoresist 130 located above the opening area 370 is exposed.

In addition, in the exposure process in Step S13 described above, the light is selectively radiated to an area which is desired to be removed, that is, an area, of the positive type photoresist 130, in which the spacer 150 is desired not to be formed of the positive type photoresist 130 located above the light blocking area 360. For example, an area of the positive type photoresist 130 located above the gate line 300 and the signal line 310 is exposed.

When the spacer 150 is formed entirely above the gate line 300 and the signal line 310, there is the possibility that when the liquid crystal material is supplied above the array substrate 100a, the liquid crystal material is dammed, and thus cannot be uniformly supplied to the array substrate 100a. In addition, since a line width of each of the gate line 300 and the signal line 310 is small, a width of the spacer 150 formed above the gate line 300 and the signal line 310 also becomes small, and thus becomes unstable to fall down.

In the first embodiment, the spacer 150 is formed above the gate electrode 330, the source electrode 340, and the drain electrode 350 each of which is relatively wide in area. As a result, it is possible to form the stable spacer 150 which hardly falls down. In particular, since the drain electrode 350 has the large area, preferably, the spacer 150 is disposed above the drain electrode 350.

As has been described, in the first embodiment, the spacer 150 is formed above the light blocking area 360. For this reason, since it is unnecessary to newly provide a light blocking pattern for measures taken to cope with the light leakage due to the spacer 150, it becomes possible to increase the aperture ratio. For example, when the spacer 150 is disposed in an area 371 located in the opening area 370 shown in FIG. 4, it is necessary to provide the light blocking pattern in the area 371. As a result, an area of the opening area 370 becomes small to reduce the aperture ratio.

Next, a description will be given with respect to details of the transistor 110 in the array substrate 110a.

Figure 5:
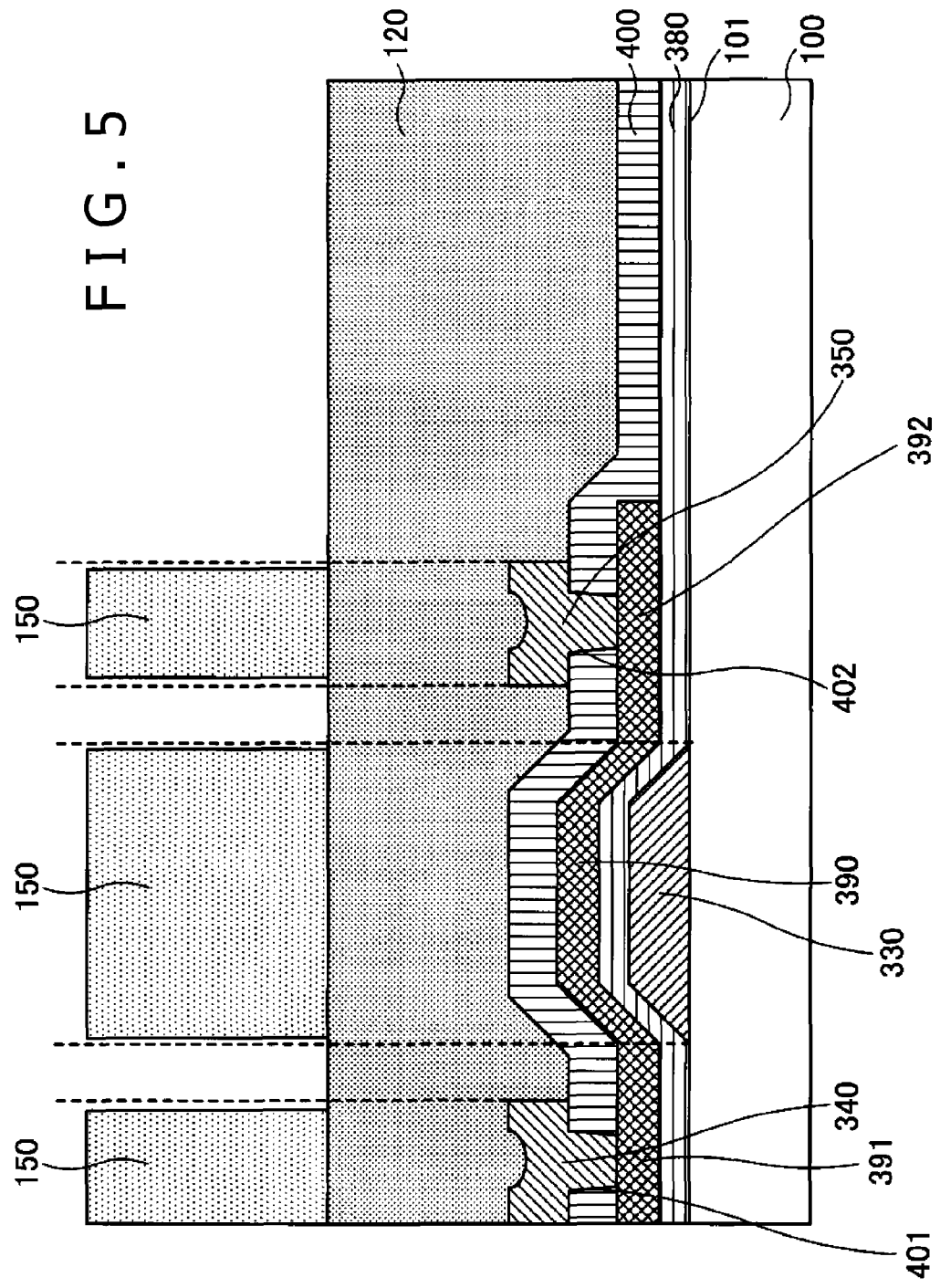
FIG. 5 is a cross sectional view showing an example of the array substrate in the first embodiment of the present invention.

FIG. 5 is a cross sectional view showing an example of the array substrate in the first embodiment.

The gate electrode 330 is formed on the surface 101 of the transparent substrate 100. In addition, a gate insulating film 380 is formed on the surface 101 of the transparent substrate 100 so as to cover the gate electrode 330. In addition, a semiconductor layer 390 is formed on the gate insulating film 380 so as to cross the gate electrode 330. A source region 391 and a drain region 392 are provided in regions of the semiconductor layer 390 between which the gate electrode 330 is sandwiched, respectively.

In addition, an interlayer insulating film 400 is formed above the surface 101 of the transparent substrate 100 so as to cover the semiconductor layer 390. A contact hole 401 through which the source region 391 of the semiconductor layer 390 is exposed, and a contact hole 402 through which the drain region 392 of the semiconductor layer 390 is exposed are both provided in the interlayer insulating film.

In addition, the source electrode 340 and the drain electrode 350 are formed so as to be filled in the contact hole 401 and the contact hole 402, respectively, which are formed in the interlayer insulating film 400. The source electrode 340 is electrically connected to the source region 391 of the semiconductor layer 390 through the contact hole 401. Also, the drain electrode 350 is electrically connected to the drain region 392 of the semiconductor layer 390 through the contact hole 402. In addition, the planarizing film 120 is formed on the interlayer insulating film 400 so as to cover the source electrode 340 and the drain electrode 350. Either the inorganic film which functions as the passivation use application, or the organic film which functions as the planarization use application is used as the planarizing film 120. In addition, both the inorganic film and the organic film may also be laminated to be used as the planarizing film 120. The pixel electrode and the like complying with the liquid crystal modes for controlling the alignment of the liquid crystal are formed on the planarizing film 120.

Plural spacers 150 are formed on the array substrate 100a in which the transistor 110, the planarizing film 120, and the pixel electrode structure are formed. The spacers 150 are located above the gate electrode 330, the source electrode 340, and the drain electrode 350, respectively. The patterning is carried out in the self-align manner by carrying out the exposure with the gate electrode 330, the source electrode 340, and the drain electrode 350 as the mask in Step S12 described above, and the development in Step S14 described above, thereby forming the spacers 150.

For this reason, the spacers 150 are disposed above the gate electrode 330, the source electrode 340, and the drain electrode 350, respectively, with the highly positional precise. That is to say, the spacers 150 are disposed without running over to the opening area 370.

It is noted that in order to make the spacers 150 smaller than the gate electrode 330, the source electrode 340, and the drain electrode 350, respectively, for example, it is only necessary to increase an exposure amount in the exposure process in Step S12 described above. Since the exposure spreads in the lateral direction as well by increasing the exposure amount, a width of each of the spacers 150 becomes small.

As has been described so far, the first embodiment has the process for forming the positive type photoresist 130 above the transparent substrate 100 having the transistor 110 formed thereon, and the process for radiating the light from the back surface 102 side to the transparent substrate 100 having the positive type photoresist 130 formed thereabove, thereby exposing the positive type photoresist 130.

As a result, the positive type photoresist 130 is exposed in the self-align manner with the transistor 110 as the mask. For this reason, the spacers 150 can be disposed above the transistor 110 with the highly positional precision.

That is to say, the spacers 150 can be formed without running over to the opening area 370, and it is possible to suppress the light leakage due to the spacers 150.

In addition, the spacers 150 are provided above the transistor 110. For this reason, since it is unnecessary to newly provide the light blocking pattern for measures taken to cope with the light leakage due to the spacers 150, it becomes possible to increase the aperture ratio.

Next, an embodiment in which the method of manufacturing the display device according to the first embodiment of the present invention is applied to formation of an oriented nuclear will be described as a second embodiment of the present invention.

Second Embodiment

FIG. 6 is a flow chart showing a method of manufacturing a display device according to the second embodiment of the present invention. Also, FIGS. 7A to 7F are cross sectional views showing manufacturing processes in the method of manufacturing a display device according to the second embodiment of the present invention. Hereinafter, the method of manufacturing a display device according to the second embodiment of the present invention will be described in accordance with the flow chart of FIG. 6 with reference to the process chart of FIGS. 7A to 7F. In FIGS. 7A to 7F, portions corresponding to those in FIGS. 2A to 2F are designated by the same reference numerals or symbols, respectively, and a repeated description thereof is omitted here for the sake of simplicity.

Firstly, a method of manufacturing an array substrate side will be described.

Figure 7A:
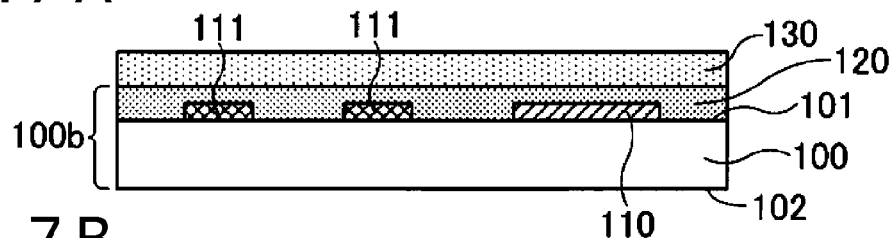
FIGS. 7A to 7F are cross sectional views showing manufacturing processes in the method of manufacturing a display device according to the second embodiment of the present invention, respectively.

[Step S30] As shown in FIG. 7A, the transistor 110 and a light blocking pattern 111 are formed on the surface 101 of the transparent substrate 100. The light blocking pattern 111 is disposed in an oriented nuclear area. The light blocking pattern 111 is formed from a metallic pattern of molybdenum, titanium or the like. In addition, for example, the light blocking pattern 111 and the transistor 110 are both formed by patterning the same metallic layer.

The planarizing film 120 is formed on the surface 101 of the transparent substrate 100 so as to cover both the transistor 110 and the light blocking pattern 111. Either the inorganic film which functions as the passivation use application, or the organic film which functions as the planarizing use application is used as the planarizing film 120. In addition, both the inorganic film and the organic film may also be laminated to be used as the planarizing film 120. The pixel electrode and the like complying with the liquid crystal modes for controlling the alignment of the liquid crystal are formed on the planarizing film 120. Here, a substrate member in which the transistor 110, the planarizing film 120, and the pixel electrode structure complying with the liquid crystal modes are formed on the surface 101 of the transparent substrate 100 is taken to be an array substrate 100b.

[Step S31] Next, the positive type photoresist 130 is formed on the array substrate 100b.

Figure 7B:
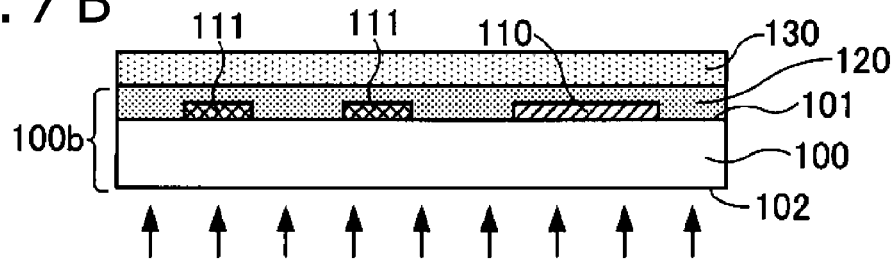

[Step S32] Next, as shown in FIG. 7B, a light is radiated from the back surface 102 side of the transparent substrate 100 to the array substrate 100b having the positive type photoresist 130 formed therein, thereby exposing the positive type photoresist 130.

In this exposure process, of the positive type photoresist 130, the area except for the area located on the transistor 110 and the light blocking pattern 111 is exposed. Of the positive type photoresist 130, the area located on the transistor 110 and the light blocking pattern 111 is not exposed because the exposure light is blocked for that area by the transistor 110 and the light blocking pattern 111. That is to say, the positive type photoresist 130 is selectively exposed in the self-align manner with the transistor 110 and the light blocking pattern 111 as a mask.

Figure 7C:
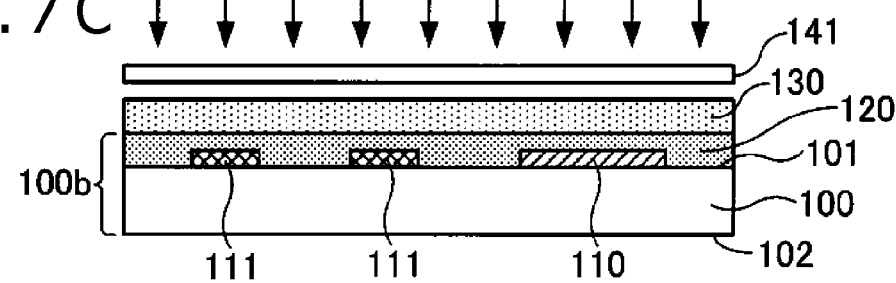

[Step S33] Next, as shown in FIG. 7C, the light is radiated from the surface 101 side of the transparent substrate 100 to the array substrate 100b having the positive type photoresist 130 formed thereon through a mask 141.

In this exposure process, of the positive type photoresist 130, the area which is not yet exposed in the phase of the exposure in Step S32 described above due to presence of the metallic pattern other than the transistor 110, and the area, such as the area located on the pad area, in which the positive type photoresist 130 is desired not to be finally left are selectively exposed.

In addition, at this time, half exposure is carried out for the positive type photoresist 130 located in the oriented nuclear area.

It is noted that the process in Step S33 can also be replaced in order with the process in Step S32.

Figure 7D:
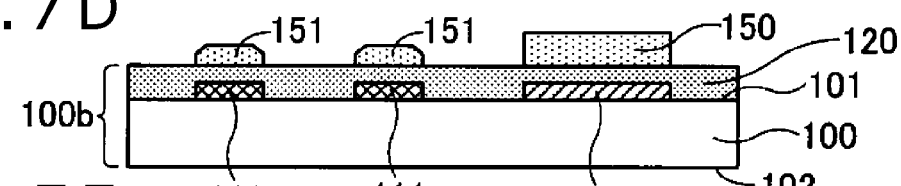

[Step S34] Next, as shown in FIG. 7D, the positive type photoresist 130 thus exposed is developed. In this development process, the portions of the positive type photoresist 130 which are exposed by the exposure process in Step S32, and the exposure process in Step S33, respectively, are removed away, and the portion of the positive type photoresist 130 located on the transistor 110 is selectively left to become the spacer 150. In addition, the portion of the positive type photoresist 130 located above the light blocking pattern 111 is also selectively left to become the oriented nuclear 151. It is noted that since the positive type photoresist 130 is subjected to the half exposure, the oriented nuclear 151 is lower in height than the spacer 150.

[Step S35] Next, the UV cure is carried out for both the spacer 150 and the oriented nuclear 151. As a result, it becomes possible to suppress the deformation of the spacer 150 and the oriented nuclear 151 by the thermal reflow in the post exposure bake process. It is noted that the spacer 150 and the oriented nuclear 151 are made of the materials each having a sufficiently high glass-transition point, the UV cure may not be carried out.

[Step S36] Next, the post exposure bake is carried out for the spacer 150 and the oriented nuclear 151, thereby subjecting both the spacer 150 and the oriented nuclear 151 to the main baking.

[Step S37] Next, the alignment film (not shown) is formed on the array substrate 100b by utilizing the printing method.

Next, a method of manufacturing a color filter substrate side will be described.

Figure 7E:
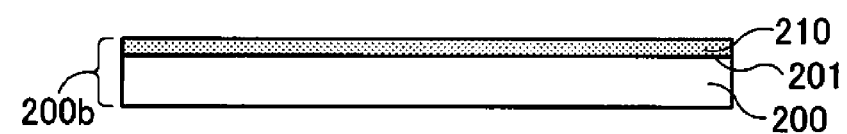

[Step S38] Firstly, as shown in FIG. 7E, the color filter 210 is formed on the surface 201 of the transparent substrate 200. Here, a substrate member in which the color filter 210 is formed on the surface 201 of the transparent substrate 200 is taken to be a color filter substrate 200b.

[Step S39] Next, an overcoat layer (not shown) is formed on the color filter substrate 200b. A stepped portion may be formed in the overcoat layer as may be necessary.

[Step S40] Next, an Indium Tin Oxide (ITO) pattern (not shown) is formed above the color filter substrate 200b.

[Step S41] Next, a protrusion pattern (not shown) is formed above the color filter substrate 200b. It is noted that the process in Step S41 can be replaced in order with the process in Step S40 described above. In addition, only any one of the ITO pattern and the protrusion pattern may be formed.

[Step S42] Next, the alignment film (not shown) is formed above the color filter substrate 200b by utilizing the printing method.

Next, a process for laminating the array substrate 100b or the color filter substrate 200b on each other will be described.

[Step S43] Firstly, the seal material (not shown) is supplied above any one of the array substrate 100b or the color filter substrate 200b. The seal material is drawn along the external periphery of either the array substrate 100b or the color filter substrate 200b.

Figure 7F:
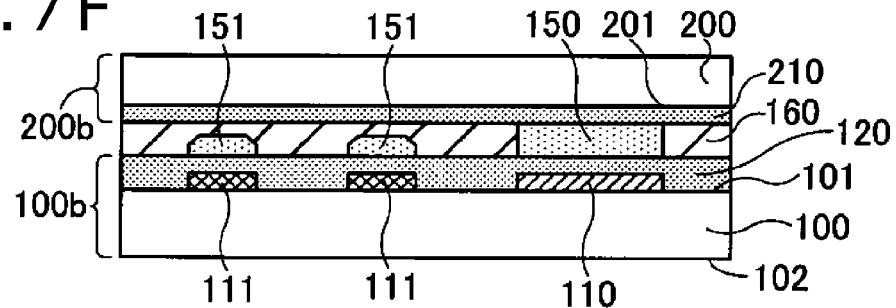

[Step S44] Next, as shown in FIG. 7F, the color filter substrate 200b is laminated on the array substrate 100b through the spacer 150. That is to say, the array substrate 100b and the color filter substrate 200b are stuck to each other by the seal material.

The liquid crystal layer 160 is formed between the array substrate 100b and the color filter substrate 200b so as to surround the spacers 150 and so as to cover the oriented nuclear 151.

The display device is manufactured in the processes described above. In the second embodiment, the oriented nuclear 151 can be formed in the process of the back surface exposure and the development process for formation of the spacer 150 in such a manner. For this reason, it is possible to simplify the processes for forming the oriented nuclear 151.

In addition, in the second embodiment as well, similarly to the case of the first embodiment, the spacer 150 can be formed without running over to the opening area 370. Thus, it is possible to suppress the light leakage due to the spacer 150. In addition, the spacer 150 is formed above the transistor 110. For this reason, since it is unnecessary to newly provide the light blocking pattern for measures taken to cope with the light leakage due to the spacer 150, it becomes possible to increase the aperture ratio.

Third Embodiment

Next, the display device according to a third embodiment of the present invention will be described.

The display device according to the third embodiment of the present invention includes: the transparent substrate 100 having the surface 101 on which the transistor 110 is formed; the spacer 150 formed above the surface 101 of the transparent substrate 100, located above the drain electrode 350 composing the transistor 110, and made of the positive type photoresist 130 as the material; the liquid crystal layer 160 formed above the surface 101 of the transparent substrate 100 so as to surround the spacer 150; and the transparent substrate 200 laminated above the surface 101 of the transparent substrate 100 through the spacer 150 and the liquid crystal layer 160.

The present application contains subject matter related to that disclosed in Japanese Priority Patent Application JP 2010-112997 filed in the Japan Patent Office on May 17, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method of manufacturing a display device, comprising the steps of:
    forming a positive type photoresist above a surface of a first transparent substrate that has a transistor formed on the surface, the transistor having a source electrode, a gate electrode, and a drain electrode;
    radiating light to the first transparent substrate having the positive type photoresist formed thereabove from a back surface side of the first transparent substrate to expose the positive type photoresist, the positive type photoresist being selectively exposed by using the source electrode, the gate electrode, and the drain electrode of the transistor as a mask;
    developing the exposed positive type photoresist to selectively leave portions of the positive type photoresist located above the source, gate, and drain electrodes of the transistor so as to form spacers disposed respectively above the source, gate, and drain electrodes; and laminating a second transparent substrate above the first transparent substrate through the spacers so that a space is formed between the first transparent substrate and the second transparent substrate.

2. The method of claim 1, further comprising the step of radiating light to said first transparent substrate having the positive type photoresist formed thereabove from the side of the surface on which the transistor is formed through a separate mask so as to further selectively expose the positive type photoresist.

3. The method of manufacturing a display device according to claim 2, wherein:

a light blocking pattern having a light blocking property is formed on the surface of the first transparent substrate, the positive type photoresist is formed over the transistor and the light blocking pattern, and the exposed positive type photoresist is developed to selectively leave the portions of the positive type photoresist respectively located above the source, gate, and drain electrodes of the transistor and a portion of the positive type photoresist located above light blocking pattern to form the spacers and an oriented nuclear.

4. The method of claim 3, further comprising step of subjecting the portion of the positive type photoresist located above the light blocking pattern to half exposure.

5. The method of claim 1, wherein a liquid crystal layer is formed between the first transparent substrate and the second transparent substrate so as to surround the spacers.

6. The method of claim 1, wherein the transistor has a metallic pattern having a light blocking property.

7. The method of claim 1, wherein a color filter is formed above the first transparent substrate, and the second transparent substrate is laminated above the first transparent substrate in such a way that the first transparent substrate and the second transparent substrate face each other.

8. The method of claim 1, wherein a width of each of the spacers is made to be smaller than a width of a respective electrode over which the spacer is located by increasing an exposure amount.

* * * * *